US007689341B2

United States Patent
Miller

(10) Patent No.: US 7,689,341 B2
(45) Date of Patent: Mar. 30, 2010

(54) PRIORITIZED RECAPTURE OF ENERGY DURING DECELERATION OF A DUAL-HYBRID MOTOR VEHICLE

(75) Inventor: Stanton E. Miller, Fort Wayne, IN (US)

(73) Assignee: International Truck Intellectual Property Company, LLC, Warrenville, IL (US)

( * ) Notice: Subject to any disclaimer, the term of this patent is extended or adjusted under 35 U.S.C. 154(b) by 0 days.

(21) Appl. No.: 11/947,213

(22) Filed: Nov. 29, 2007

(65) Prior Publication Data

US 2009/0139788 A1 Jun. 4, 2009

(51) Int. Cl.
*G06F 19/00* (2006.01)
(52) U.S. Cl. .................. 701/70; 701/110; 180/65.1; 180/165; 180/168; 180/170
(58) Field of Classification Search .............. 701/93, 701/22, 70, 110; 180/166, 168, 170, 65.1, 180/65.8
See application file for complete search history.

(56) References Cited

U.S. PATENT DOCUMENTS

| 5,230,402 | A | 7/1993 | Clark et al. |
| 6,170,587 | B1 * | 1/2001 | Bullock ..................... 180/69.6 |
| 6,454,033 | B1 | 9/2002 | Nathan et al. |
| 7,111,704 | B2 | 9/2006 | Johnson |
| 7,201,095 | B2 * | 4/2007 | Hughey ....................... 91/408 |
| 2008/0083576 | A1 | 4/2008 | Read |

FOREIGN PATENT DOCUMENTS

| DE | 197 45 810 | 5/1998 |
| EP | 1 935 712 | 6/2008 |

OTHER PUBLICATIONS

European Search Report from corresponding EP Application 08019110.9, dated Mar. 27, 2009.

* cited by examiner

*Primary Examiner*—Tuan C To
*Assistant Examiner*—Redhwan Mawari
(74) *Attorney, Agent, or Firm*—Jeffrey P. Calfa; Mark C. Bach

(57) ABSTRACT

One energy recovery system (30) that can decelerate the vehicle in response to a brake request stores recovered energy electrically in a battery bank (32). Another energy recovery system (36) stores recovered energy hydraulically in a high pressure accumulator (40). One system is given priority over the other when a brake request is issued. When the stored energies are reused to accelerate the vehicle, one form of stored energy is used before the other.

10 Claims, 4 Drawing Sheets

PRIORITIZED RECAPTURE OF ENERGY DURING DECELERATION OF A DUAL-HYBRID MOTOR VEHICLE

FIELD OF THE INVENTION

This invention relates to a motor vehicle that, in addition to having foundation brakes, has energy recovery systems associated with its drivetrain for decelerating the vehicle by converting kinetic energy of the vehicle into stored potential energy that can be subsequently used to accelerate the vehicle. In particular, the invention relates to a motor vehicle having a processor containing algorithms that when executed cause those systems to recapture and later reuse the energy according to certain priorities.

BACKGROUND OF THE INVENTION

A large motor vehicle, such as a heavy truck, has substantial kinetic energy when in motion. When the accelerator pedal that has been depressed to accelerate the vehicle is released, the powertrain itself becomes a load that decelerates the vehicle. While foundation brakes at the wheels are the primary means for stopping the vehicle, one or more deceleration devices and/or systems that when operated can impose a load on the driven wheels may also be available for decelerating the vehicle. Examples of such devices include exhaust brakes, engine brakes, and driveline retarders. Downshifting of the transmission increases the braking load that the engine imposes on the drivetrain, and can also be used to decelerate the vehicle.

When actuated, the foundation brakes apply friction forces to rotating wheels, creating torque that opposes wheel rotation. That torque creates forces at the interfaces between rubber tires on the wheels and the underlying road surface that oppose the direction of vehicle motion along the road, thereby decelerating the vehicle. Waste heat is generated both at the foundation brakes and at the tire/road interfaces.

A strategy and method that can recapture and store energy from what would otherwise become waste heat for later use to accelerate a vehicle is obviously desirable for a number of reasons, one of which is improved fuel economy and another of which is reduction in wear on the foundation brakes. Even an ability to recapture what might be seen by some as fairly small amounts of energy can be meaningful to the operation of fleets of commercial vehicles like large trucks and highway tractors.

Certain motor vehicles (commonly called hybrids) have energy storage means, such as pressurized fluid vessels or storage batteries that store potential energy that was converted from kinetic energy as the vehicle decelerated (such method of deceleration sometimes being called regenerative braking). A vehicle that is equipped with two different types of energy recapture systems is sometimes called a dual-hybrid vehicle. If those systems are capable of recapturing sufficient energy to satisfy a deceleration request, foundation brakes need not be applied.

A strategy and method that coordinates the operation of certain engine/powertrain deceleration systems with the operation of foundation brakes for recapturing what would otherwise become waste energy should give precedence to regenerative braking when vehicle operating conditions make it appropriate to do so. If a braking request cannot be satisfied by regenerative braking alone, or when the on-board energy storage means cannot accept any more energy for storage, then the use of engine/powertrain deceleration systems that do not store, but rather simply dissipate, energy may become appropriate before foundation brakes are applied. In other words, when a vehicle has various on-board systems and/or devices that are potentially available for decelerating a moving vehicle, including energy recapture and storage systems, a preferential order for using such devices to satisfy a braking request may be: use of the energy recapture and storage systems; use of energy-dissipating systems and/or devices other than foundation brakes; and lastly, foundation brakes themselves.

One system and method for decelerating a moving vehicle by recapture of kinetic energy comprises coupling an electric motor/generator through a portion of the vehicle drivetrain to driven wheels and controlling the degree of coupling in a manner that causes kinetic energy of the moving vehicle to be used to operate the motor/generator as a generator delivering electric current to recharge an on-board bank of storage batteries. Depending on conditions under which the vehicle is being driven and/or state of battery bank charge, the battery bank may be unable to accept all the kinetic energy that needs to be dissipated in order to satisfy a particular braking request, therefore requiring that energy-dissipating systems or devices such as foundation brakes be used to make up the difference.

Another system and method for decelerating a moving vehicle by recapture and storage of energy comprises coupling a hydraulic pump/motor (hydraulic motor/generator) through a portion of the drivetrain to driven wheels and controlling the degree of coupling in a manner that causes kinetic energy of the moving vehicle to operate the hydraulic motor/generator as a pump to charge a hydraulic accumulator. Depending on conditions under which the vehicle is being driven and/or the accumulator state-of-charge, the accumulator may be unable to accept all the kinetic energy that needs to be dissipated in order to satisfy a particular braking request, also requiring that energy-dissipating systems or devices such as foundation brakes be used to make up the difference.

SUMMARY OF THE INVENTION

The present invention relates to a strategy and method for decelerating a moving vehicle by allocating conversion of its kinetic energy among one or more electric energy storage devices that can store potential energy, one or more hydraulic energy storage devices that can also store potential energy, and one or more braking devices, including foundation brakes, that dissipate the energy without the ability to store it for reuse in accelerating the vehicle. The allocation is made according to certain hierarchies for invoking energy recovery by electric storage and by hydraulic storage depending on how the vehicle is being driven.

The inventive strategy and method also embody certain hierarchies for reuse of stored energy to accelerate the vehicle.

Operation of various deceleration systems and/or devices, including systems used for kinetic energy recovery and storage as potential energy, is controlled by an electronic systems controller that evaluates a braking (i.e. deceleration) request. Such a request is typically provided to the systems controller by an electric signal from the brake pedal position sensor that is operated when a driver of the vehicle depresses the brake pedal.

One generic aspect of the present invention relates to a motor vehicle comprising a chassis having wheels on which the vehicle travels and an internal combustion engine that drives at least some wheels through a drivetrain. When a decelerator (typically a brake pedal position sensor) issues vehicle deceleration request data to request deceleration of the vehicle, a processor processes the issued vehicle deceleration request data according to an algorithm having a hierarchy that contains assigned priorities for utilization of multiple systems capable of decelerating the vehicle.

The algorithm comprises a strategy that in response to an issued deceleration request first causes a relatively higher priority system to be utilized. When the relatively higher priority system is incapable of satisfying the issued deceleration request, the strategy causes a relatively lower priority system to be utilized concurrent with continued utilization of the relatively higher priority system. When the relatively higher and relatively lower priority systems collectively are incapable of satisfying the issued deceleration request, the strategy causes one or more other systems to be utilized concurrent with continued utilization of the relatively higher and relatively lower priority systems.

The relatively higher priority system comprises one of a first energy recovery system for recovering energy by storing electrical charge and a second energy recovery system for recovering energy by storing hydraulic fluid under pressure. The relatively lower priority system comprises the other of the two energy recovery systems.

A further generic aspect of the invention relates to a method for decelerating a motor vehicle that has a chassis having wheels on which the vehicle travels, at least some of which are driven by an internal combustion engine through a drivetrain, a decelerator for issuing vehicle deceleration request data to request deceleration of the vehicle, multiple systems each capable of decelerating the vehicle, and a processor for processing issued vehicle deceleration request data according to an algorithm containing a hierarchy for utilization of the systems.

The method comprises: in response to issuance of a deceleration request, executing the algorithm to cause: a) energy recovery by one of a first energy recovery system that recovers energy by storing electrical charge and a second energy recovery system that recovers energy by storing hydraulic fluid under pressure; b) energy recovery by the other energy recovery system concurrent with continued energy recovery by the one energy recovery system when the one energy recovery system is incapable of satisfying the issued deceleration request; and c) one or more other systems to be utilized concurrent with continued energy recovery by the first and second energy recovery systems when the first and second energy recovery systems collectively are incapable of satisfying the issued deceleration request.

The foregoing, along with further features and advantages of the invention, will be seen in the following disclosure of a presently preferred embodiment of the invention depicting the best mode contemplated at this time for carrying out the invention. This specification includes drawings, now briefly described as follows.

DESCRIPTION OF THE PREFERRED EMBODIMENT

Figure 1:
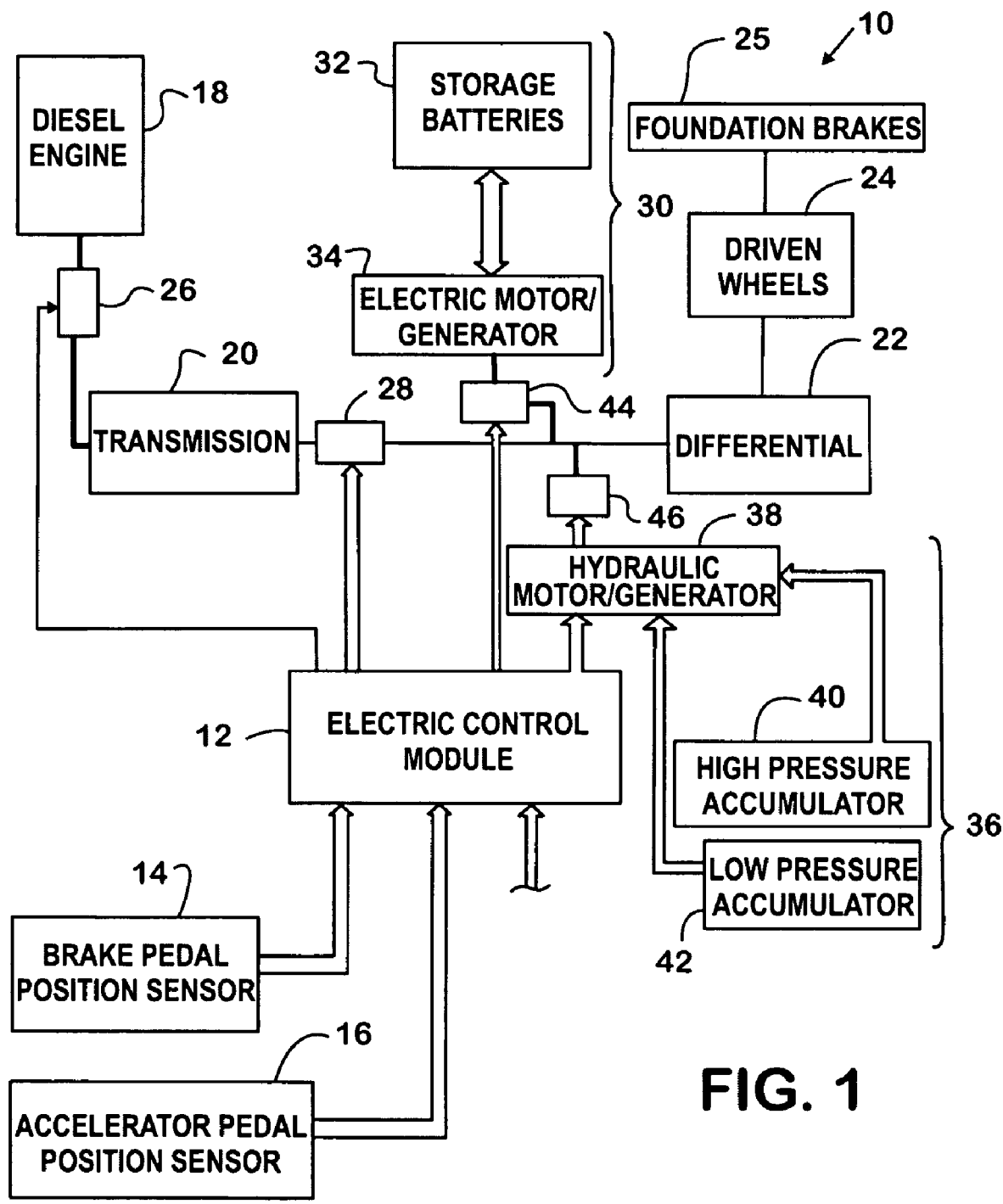
FIG. 1 is a general schematic diagram of a portion of a motor vehicle relevant to an understanding of principles of the strategy and method of present invention.

FIG. 1 shows a portion of a motor vehicle 10 relevant to an understanding of principles of the present invention. An electronic systems controller (ESC) contained in an electronic control module 12 comprises a processor that is in communication with various data sources including a brake pedal position sensor 14 and an accelerator pedal position sensor 16.

Vehicle 10 comprises a powertrain that may be considered to comprise an internal combustion engine 18, such as a diesel engine, a transmission 20, and a differential 22 that forms part of an axle assembly having driven wheels 24 on opposite ends. In a heavy truck, the axle assembly would typically be a rear axle assembly and front wheels of the truck (not shown in the drawing) would typically be steered wheels that are not driven by the powertrain. Foundation brakes 25 are at each of the wheels, both driven rear wheels and non-driven front wheels.

A clutch 26 couples the flywheel of engine 18 to an input shaft or input gear of transmission 20. A drivetrain that includes differential 22 couples an output shaft or gear of transmission 20 to driven wheels 24. Transmission 20 is coupled to differential 22 through a clutch 28.

A first energy recovery system 30 comprises a bank of D.C. storage batteries 32 and an electric motor/generator 34. A second energy recovery system 36 comprises a hydraulic motor/generator (hydraulic pump/motor) 38, a high pressure hydraulic accumulator 40, and a low pressure hydraulic accumulator 42.

Electric motor/generator 34 is coupled to the drivetrain via a clutch 44, and hydraulic motor/generator 38 is coupled to the drivetrain via a clutch 46. Engagement and disengagement of each of the four clutches 26, 28, 44, and 46 are controlled by the ESC.

The ESC comprises a processor for processing deceleration request data from brake pedal position sensor 14 and acceleration request data from accelerator pedal position sensor 16. The processor processes deceleration request data issued by sensor 14 according to an algorithm having a hierarchy that contains assigned priorities for utilization of energy recovery systems 30 and 36. The processor also processes acceleration request data issued by sensor 16 according to an algorithm having a hierarchy that contains assigned priorities for using energy stored in energy recovery systems 30 and 36 to accelerate the vehicle.

The deceleration, or brake energy recovery, algorithm comprises a strategy that in response to an issued deceleration request, causes a relatively higher priority system to be utilized first. When the relatively higher priority system is incapable of satisfying the issued deceleration request, the strategy causes a relatively lower priority system to be utilized concurrent with continued utilization of the relatively higher priority system. When the relatively higher and relatively lower priority systems collectively are incapable of satisfying the issued deceleration request, the strategy causes one or more other systems and/or devices, such as the foundation brakes to be utilized concurrent with continued utilization of the relatively higher and relatively lower priority systems.

Figure 2:
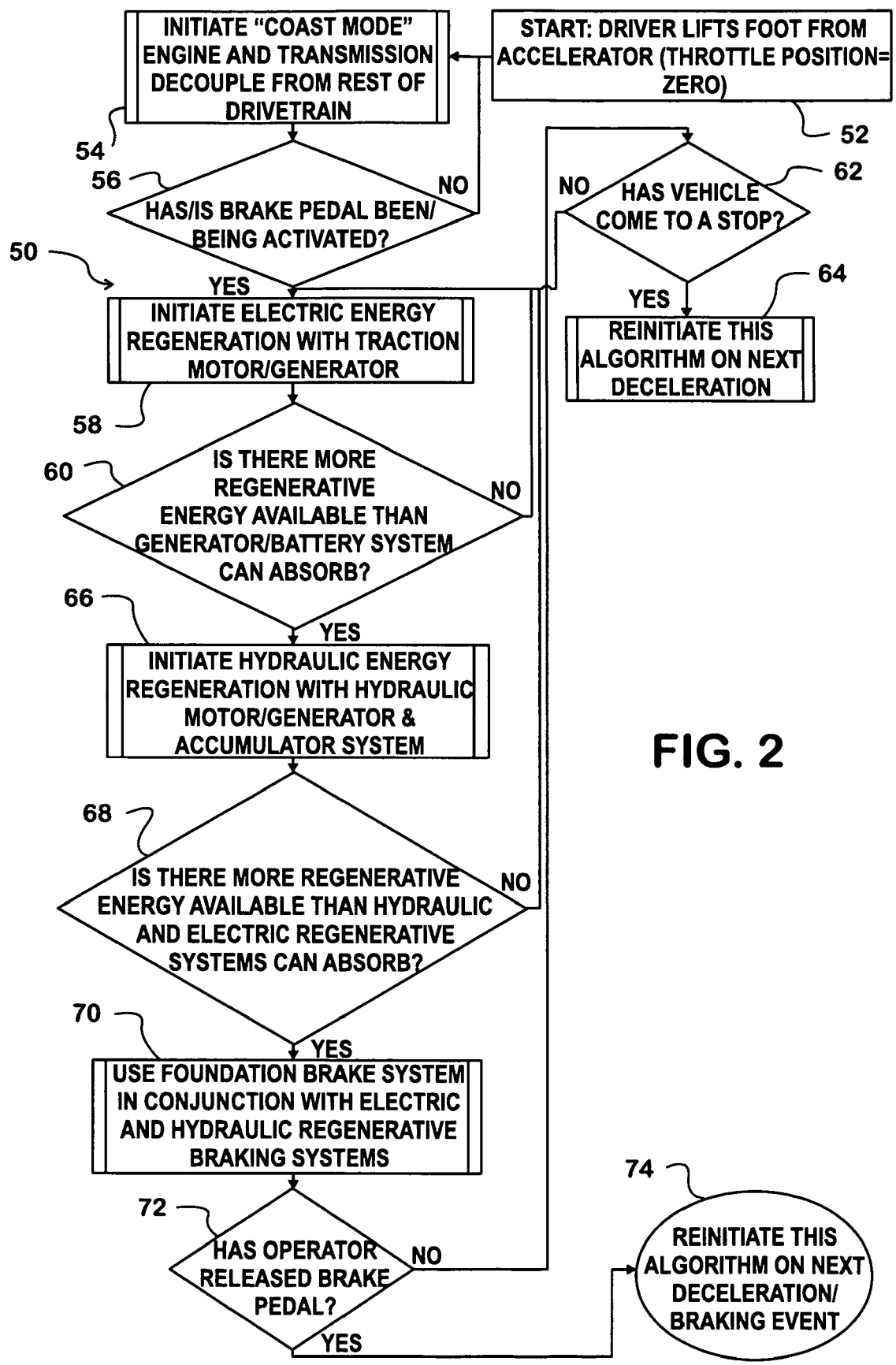
FIG. 2 comprises a general flow diagram of an algorithm via which the inventive strategy and method are embodied in a processor of an electronic systems controller for recovery of energy during deceleration of the vehicle in response to a deceleration request.

FIG. 2 shows a general flow diagram 50 for a preferred embodiment of the brake energy recovery strategy. With the vehicle moving, execution of the algorithm is initiated when the driver releases the accelerator pedal (step 52) to cause sensor 16 to return to zero.

The algorithm initiates a "coast mode" (step 54) during which clutches 28, 44, and 46 are disengaged to remove engine 18, transmission 20, electric motor/generator 34, and hydraulic motor/generator 36 as braking loads on the driven wheels 24. If the brake pedal is not being depressed (decision step 56), the vehicle becomes free wheeling as the coast mode continues.

When the brake pedal is depressed (decision step 56), sensor 14 issues a deceleration request to the ESC based on the extent to which the brake pedal is being depressed. The strategy embodied in the algorithm causes clutch 44, which had heretofore been disengaged, to engage. The driven wheels 24, acting via differential 22 and clutch 44, operate electric motor/generator 34 as a generator to begin charging the storage bank batteries 32 (step 58). In this way kinetic energy of the moving vehicle is converted into stored electrical energy, decelerating the vehicle in the process.

If energy recovery system 30 can satisfy the request by itself (decision step 60), steps 58 and 60 continue to iterate until the vehicle comes to a stop (decision step 62). When the vehicle stops, further execution of the algorithm ceases until a subsequent deceleration request is issued (step 64).

If energy recovery system 30 is incapable by itself of satisfying the deceleration request (decision step 60), the strategy embodied in the algorithm begins to utilize energy recovery system 36 as well by causing clutch 46, which had heretofore been disengaged, to engage. The driven wheels 24, acting via differential 22 and clutch 46, now begin to operate pump/motor 38 as a pump that pumps hydraulic fluid from low pressure accumulator 42 into high pressure accumulator 40 (step 66). Consequently, kinetic energy of the moving vehicle is now being converted into both stored electrical energy and stored hydraulic energy.

Low pressure accumulator 42 is basically a reservoir that supplies pump/motor 38 with fluid when system 36 is decelerating/braking. Pump/motor 38, acting as a pump, pumps the fluid in accumulator 42 into accumulator 40. Because the fluid is incompressible, the accumulators are typically charged with a gas such as nitrogen on one side of a bladder. As fluid is pumped into the accumulator on the other side of the bladder, the nitrogen pressure increases to be in equilibrium with the hydraulic fluid pressure. Low pressure reservoir 42 may either be at atmospheric pressure, or some elevated pressure relative to atmospheric.

If the two energy recovery systems 30 and 36 can now collectively satisfy the request by themselves (decision step 68), steps 58, 60, 66, and 68 continue to iterate until the vehicle comes to a stop (decision step 62). When the vehicle stops, further execution of the algorithm ceases until a subsequent deceleration request is issued (step 64).

If the two energy recovery systems 30 and 32 are together incapable of satisfying the deceleration request (decision step 68), the strategy embodied in the algorithm begins to apply the foundation brakes (step 70). While kinetic energy of the moving vehicle is still being converted into both stored electrical energy and stored hydraulic energy, the portion of the deceleration request that they cannot collectively satisfy is provided by the foundation brakes. As long as the deceleration request continues (decision step 72), the vehicle will continue to be decelerated until stopped (decision step 62). Once stopped, further execution of the algorithm ceases until a new and subsequent deceleration request is issued (step 64).

If a deceleration request is discontinued by the driver ceasing to depress the brake pedal before the vehicle has been stopped (decision step 72), further execution of the algorithm ceases until a new and subsequent deceleration request is issued (step 74).

Should the magnitude of the deceleration request change, but not be discontinued, the ESC makes adjustments as appropriate in apportioning the request among the two energy recovery systems and foundation brakes. For matching an apportioned share to either of the two energy recovery systems, the degree of engagement of the corresponding clutch is controlled. Specific detail in the algorithm can make changing allocations substantially transparent to the driver.

Figure 3:
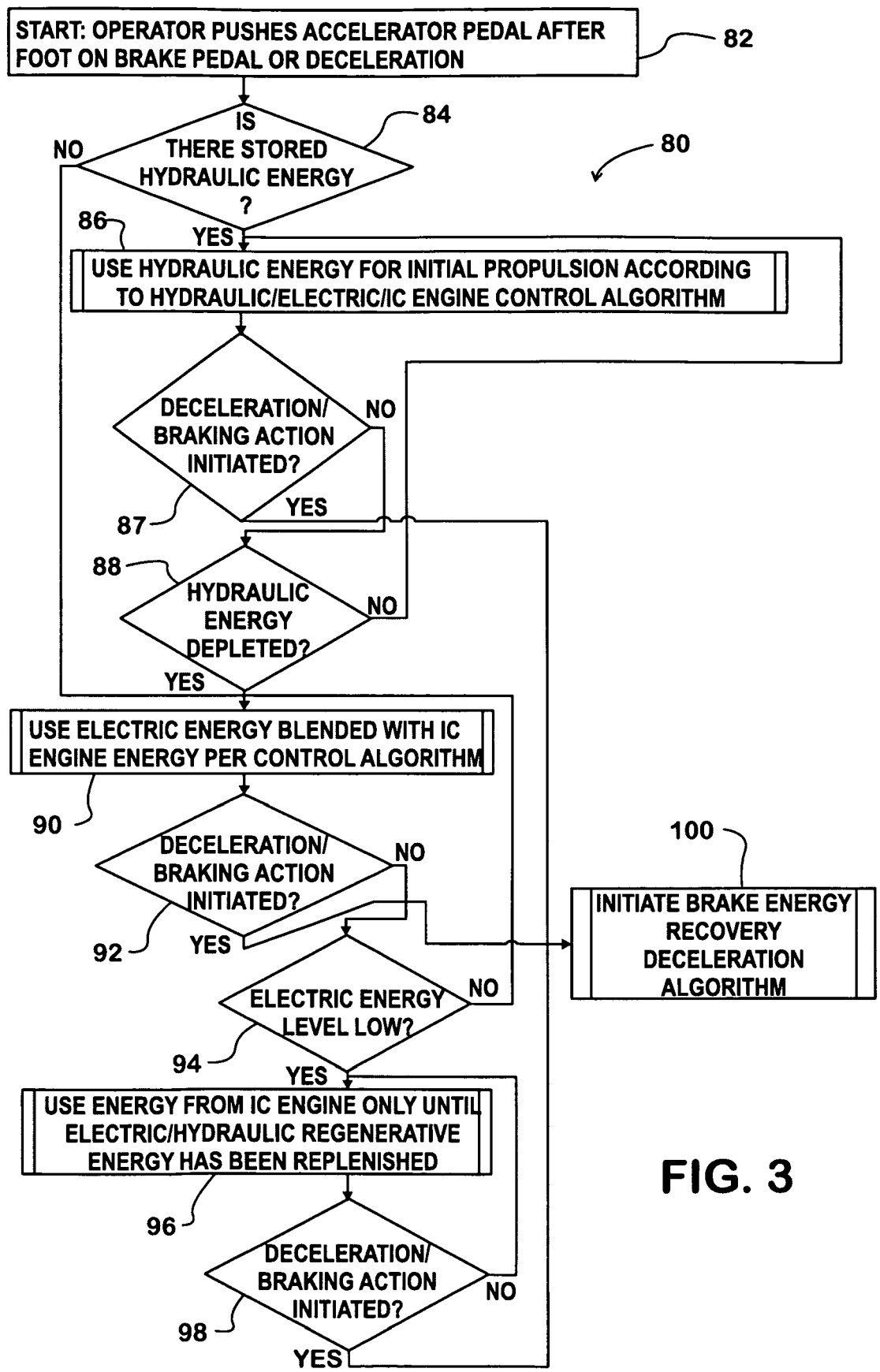
FIG. 3 comprises a general flow diagram of an algorithm via which the inventive strategy and method are embodied in a processor of an electronic system controller for reuse of recovered energy during acceleration of the vehicle in response to an acceleration request.

FIG. 3 shows a general flow diagram 80 for a preferred embodiment of a strategy for accelerating the vehicle using the potential energy stored in battery bank 32 and in high pressure accumulator 40. After the driver has released the brake pedal to discontinue a deceleration request, depression of the accelerator pedal causes sensor 16 to issue an acceleration request that causes the processor to initiate execution of an acceleration algorithm (step 82).

Assuming a sufficient quantity of hydraulic fluid under sufficient pressure is present in high pressure accumulator 40 (decision step 84), the strategy embodied in the algorithm causes clutch 46 to engage and hydraulic motor/generator 38 to operate as a hydraulic motor using pressurized fluid from high pressure accumulator 40 as the energy source (step 86). The power flow through clutch 46 and differential 22 to wheels 24 delivers torque that turns the wheels to accelerate the vehicle.

High pressure accumulator 40 has a valve that opens and allows the fluid to flow through the hydraulic motor/generator 38, which operates the device as a motor that adds mechanical energy to the drivetrain. The high pressure fluid exits the pump/motor at a low pressure state and is captured in the low pressure accumulator. This two-accumulator system may be analogized to two balloons with a turbine wheel between them. If wheels 24 are decelerating (running the turbine wheel as a pump), one balloon will fill with higher pressure air/fluid drawn from the other balloon. When the vehicle is to be accelerated, the high pressure balloon runs air/fluid across the turbine wheel and applies torque to wheels 24, thus propelling the vehicle.

Energy recovery system 36 will continue to deliver recovered energy until the pressure in accumulator 40 drops to a level near the pressure in the low pressure accumulator, at which point there is no longer any potential energy differential between the high and low pressure hydraulic accumulators (decision step 88). Clutch 46 is also disengaged at that time. The energy delivered by system 36 may be used exclusively to accelerate the vehicle, or alternately may supplement energy from engine 18 when clutches 26 and 28 are engaged.

During use of energy recovery system 36, a deceleration request will terminate the acceleration algorithm (step 87) and initiate the deceleration algorithm (step 100).

In the absence of any intervening deceleration request, energy recovery system 30 is brought on-line to continue vehicle acceleration (step 90) upon the useful stored energy in accumulator 40 having been expended. Should the brake pedal be depressed, further execution of the acceleration algorithm will cease (step 92), with clutches 28 and 44 also being disengaged, and the deceleration algorithm will be initiated (step 100).

In the absence of any deceleration request, energy recovery system 30 will continue to supply energy for acceleration, with steps 84, 86, 88, 90, and 92 reiterating, as long as the state of charge of battery bank 32 does not become lower than desired (decision step 94). The energy delivered by system 30 may be used exclusively to accelerate the vehicle, or alternately may supplement energy from engine 18 when clutch 28 is engaged.

Once the state of charge of battery bank 32 becomes lower than desired (decision step 94), wheels 24 are driven by engine 18 (step 96) until a deceleration request is issued by sensor 14 (decision step 98). The deceleration request initiates the brake energy recovery of FIG. 2 (step 100).

Figure 4:
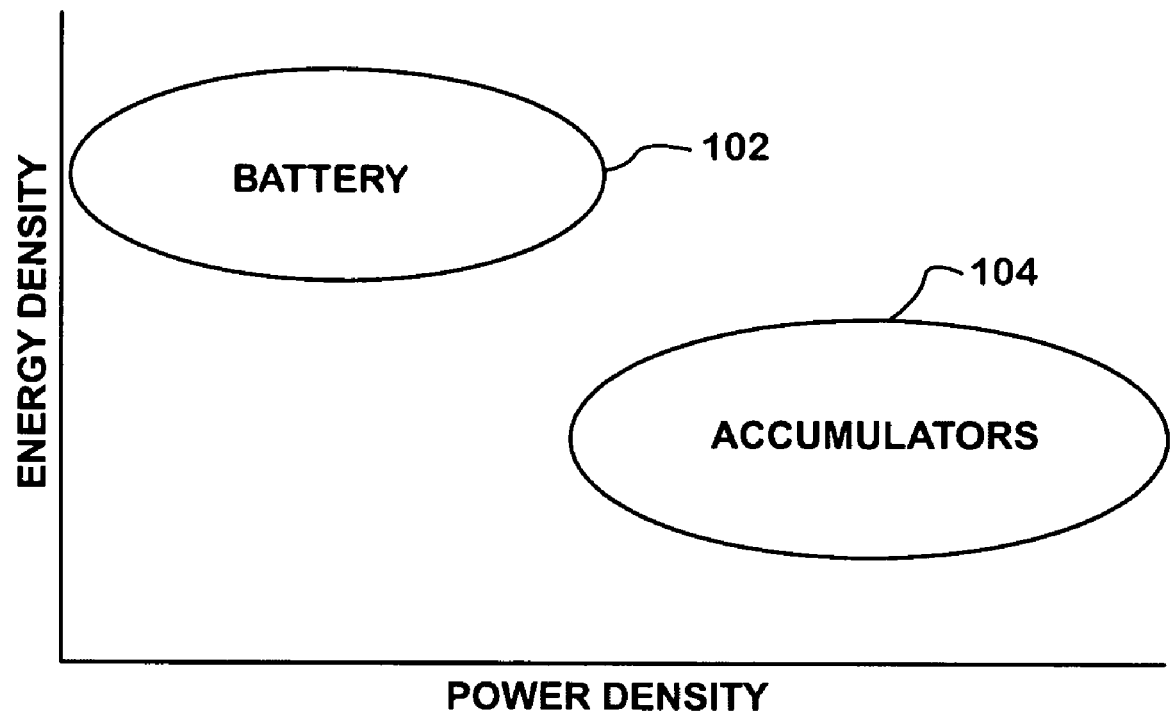
FIG. 4 is diagram useful in understanding certain principles of the invention.

FIG. 4, a Ragone diagram, is useful in understanding the importance of prioritizing use of the two energy recovery systems 30 and 36. Batteries have high energy density, but may not be able to absorb as much power (low power density) as needs to be dissipated during a deceleration/braking event. That characteristic is generally depicted by the zone 102 in FIG. 4. On the other hand, a hydraulic motor and accumulator, have great power density, but low energy density, as generally depicted by the zone 104. They are therefore able to absorb or deliver a great amount of energy within a short time (until the high pressure accumulator is filled or depleted).

A large truck that is in motion has substantial kinetic energy ($\frac{1}{2} mV^2$) to dissipate when braking occurs. The hydraulic drive system will most likely be sized for peak power absorption that the electric drive system is incapable of absorbing. Therefore, the electrical energy recovery system should be used first for energy recovery with the hydraulic system recapturing excess regenerative energy that the electric system is incapable of capturing (see FIG. 2).

A large truck has substantial mass that must be accelerated when an acceleration request is issued. This requires substantial torque input to the drivetrain. The hydraulic energy recovery system should be used first to accelerate the vehicle because its greater power density means that it can deliver greater torque.

While a presently preferred embodiment of the invention has been illustrated and described, it should be appreciated that principles of the invention apply to all embodiments falling within the scope of the following claims. One such alternate embodiment would give priority to the hydraulic recovery and storage system over the electric recovery and storage system during deceleration.

What is claimed is:

1. A motor vehicle comprising:
   a chassis comprising wheels on which the vehicle travels;
   an internal combustion engine that drives at least some wheels through a drivetrain;
   a decelerator for issuing vehicle deceleration request data to request deceleration of the vehicle,
   an accelerator for issuing vehicle acceleration request data to request acceleration of the vehicle, and
   a processor for processing issued vehicle deceleration request data and issued acceleration request data according to an algorithm having a hierarchy that contains assigned priorities for utilization of multiple systems capable of decelerating the vehicle and that comprises a strategy that: in response to an issued deceleration request, causes a relatively higher priority system to be utilized; causes a relatively lower priority system to be utilized concurrent with continued utilization of the relatively higher priority system when the relatively higher priority system is incapable of satisfying the issued deceleration request; and when the relatively higher and relatively lower priority systems collectively are incapable of satisfying the issued deceleration request, causes one or more other systems to be utilized concurrent with continued utilization of the relatively higher and relatively lower priority systems wherein the other systems comprise a foundation brake system;
   wherein the relatively higher priority system comprises an electric energy recovery system for recovering energy by storing electrical charge and the relatively lower priority system comprises a hydraulic energy recovery system for recovering energy by storing hydraulic fluid under pressure;
   and wherein the processor algorithm strategy assigns a higher priority of use to energy of the hydraulic fluid stored under pressure than to energy of the stored electrical charge that causes the hydraulic fluid stored under pressure to be used first to satisfy an issued acceleration request.

2. A motor vehicle as set forth in claim 1 wherein one of the one or more other systems comprises foundation brakes at the driven wheels.

3. A motor vehicle as set forth in claim 1 wherein the electric energy recovery system comprises an electric motor/generator that is coupled to the drivetrain via a clutch, and when utilized to decelerate the vehicle, is operated as a generator to charge a storage battery bank, and when utilized to accelerate the vehicle, is operated as a motor by the storage bank battery.

4. A motor vehicle as set forth in claim 1 wherein the hydraulic energy recovery system comprises a hydraulic pump/motor that is coupled to the drivetrain via a clutch, and when utilized to decelerate the vehicle, is operated as a pump to charge a hydraulic accumulator, and when utilized to accelerate the vehicle, is operated as a motor by charge in the hydraulic accumulator.

5. A motor vehicle as set forth in claim 1 wherein the algorithm is structured to condition effectiveness of the issued deceleration request to decelerate the vehicle on the engine first being de-coupled from the drivetrain.

6. A method for decelerating a motor vehicle that comprises a chassis having wheels on which the vehicle travels, at least some of which are driven by an internal combustion engine through a drivetrain, a decelerator for issuing vehicle deceleration request data to request deceleration of the vehicle, an accelerator for issuing vehicle acceleration request data to request acceleration of the vehicle, multiple systems each capable of decelerating the vehicle, and a processor for processing issued vehicle deceleration request data and vehicle acceleration request data according to an algorithm containing hierarchies for utilization of the systems, the method comprising:
   in response to issuance of a deceleration request, executing the algorithm according to a hierarchy that causes: a) energy to be recovered by an electric energy recovery system that recovers energy by storing electrical charge; b) when the electric energy recovery system is incapable of satisfying the issued deceleration request, energy to be recovered as hydraulic fluid under pressure by a hydraulic energy recovery system concurrent with continued energy recovery by the electric energy recovery system; and c) one or more other systems to be utilized concurrent with continued energy recovery by the electric and hydraulic energy recovery systems when the electric and hydraulic energy recovery systems collectively are incapable of satisfying the issued deceleration request wherein the other systems comprise a foundation system; and
   in response to issuance of an acceleration request, processing issued vehicle acceleration request data according to a hierarchy of the algorithm that assigns a higher priority of use to energy of the hydraulic fluid stored under pressure than to energy of the stored electrical charge to cause the hydraulic fluid stored under pressure to be used first to satisfy the issued acceleration request.

7. A method as set forth in claim 6 wherein the step of causing one or more other systems to be utilized concurrent with continued energy recovery by the electric and hydraulic energy recovery systems when the electric and hydraulic energy recovery systems collectively are incapable of satisfying the issued deceleration request comprises applying foundation brakes at the driven wheels.

8. A method as set forth in claim 6 wherein the step of causing energy recovery by the electric energy recovery system comprises coupling an electric motor/generator to the drivetrain via a clutch and operating the motor/generator as a generator to charge a storage battery bank.

9. A method as set forth in claim 6 wherein the step of causing energy recovery by the hydraulic energy recovery system comprises coupling a hydraulic pump/motor to the drivetrain via a clutch and operating the pump/motor as a pump to charge a hydraulic accumulator.

10. A method as set forth in claim 6 comprising conditioning effectiveness of the issued deceleration request to decelerate the vehicle on the engine first being de-coupled from the drivetrain.

* * * * *